(12) United States Patent
Zhou et al.

(10) Patent No.: US 8,553,154 B2
(45) Date of Patent: Oct. 8, 2013

(54) METHOD AND/OR APPARATUS FOR IMPLEMENTING A COLOR MANAGEMENT MODULE

(75) Inventors: Hui Zhou, Toronto (CA); Christopher A. Aardema, Austin, TX (US)

(73) Assignee: VIXS Systems, Inc, Toronto, Ontario (CA)

( * ) Notice: Subject to any disclaimer, the term of this patent is extended or adjusted under 35 U.S.C. 154(b) by 507 days.

(21) Appl. No.: 12/706,199

(22) Filed: Feb. 16, 2010

(65) Prior Publication Data

US 2011/0199537 A1    Aug. 18, 2011

(51) Int. Cl.
*H04N 9/64* (2006.01)

(52) U.S. Cl.
USPC ........... 348/649; 348/645; 348/656; 348/657; 345/603; 345/604; 382/167; 382/169

(58) Field of Classification Search
USPC ................. 348/582, 599, 649, 651, 671, 675, 348/703, 708, 716, 717, 591, 661, 673, 687, 348/453, 488; 345/591, 600–604; 382/164–165, 167, 171
See application file for complete search history.

(56) References Cited

U.S. PATENT DOCUMENTS

| | | | | |
|---|---|---|---|---|
| 6,782,127 B1* | 8/2004 | Lee et al. | | 382/166 |
| 6,788,812 B1* | 9/2004 | Wilkins | | 382/167 |
| 7,197,183 B2* | 3/2007 | Lee et al. | | 382/170 |
| 7,764,411 B2* | 7/2010 | Kishimoto | | 358/518 |
| 7,773,804 B2* | 8/2010 | Ting | | 382/167 |
| 7,991,235 B2* | 8/2011 | Fan et al. | | 382/232 |
| 2005/0271267 A1* | 12/2005 | Cooper et al. | | 382/162 |
| 2005/0280850 A1* | 12/2005 | Kim et al. | | 358/1.9 |
| 2006/0001928 A1* | 1/2006 | Hayaishi | | 358/518 |
| 2006/0164556 A1* | 7/2006 | Samadani et al. | | 348/649 |
| 2006/0188153 A1* | 8/2006 | Kempf et al. | | 382/167 |
| 2006/0203297 A1 | 9/2006 | Kuwata et al. | | |
| 2006/0262224 A1* | 11/2006 | Ha et al. | | 348/582 |
| 2007/0126933 A1* | 6/2007 | Ting | | 348/649 |

FOREIGN PATENT DOCUMENTS

| | | |
|---|---|---|
| EP | 1482743 A2 | 12/2004 |
| WO | 2008/021314 A2 | 2/2008 |

OTHER PUBLICATIONS

European Search Report, Application No. 11154525.7-2202, May 18, 2011, 6 Pages.

* cited by examiner

*Primary Examiner* — Jefferey Harold
*Assistant Examiner* — Humam Satti
(74) *Attorney, Agent, or Firm* — Garlick & Markison; Bruce E. Stuckman

(57) ABSTRACT

An apparatus comprising a first circuit, a processing circuit and a conversion circuit. The first circuit may be configured to generate a first intermediate signal in a second format in response to an input signal in a first format. The processing circuit may be configured to generate a second intermediate signal and a third intermediate signal in response to the first intermediate signal. The conversion circuit may be configured to generate an output signal in the first format in response to the second intermediate signal and the third intermediate signal. The processing circuit may be configured to implement color blending on the second intermediate signal in the second format prior to conversion to the first format and pass the third intermediate signal without color blending.

11 Claims, 4 Drawing Sheets

METHOD AND/OR APPARATUS FOR IMPLEMENTING A COLOR MANAGEMENT MODULE

FIELD OF THE INVENTION

The present invention relates to video processing generally and, more particularly, to a method and/or architecture for implementing a color management module.

BACKGROUND OF THE INVENTION

Digital video processing often uses color blending. Such color blending can be memory extensive. Color blending also can be an unintuitive process for a user. Conventional approaches cannot easily perform color mappings that alter a certain color while leaving other colors unchanged.

It would be desirable to implement a system and/or method for color management and/or blending that provides an intuitive interface for a user.

SUMMARY OF THE INVENTION

The present invention concerns an apparatus comprising a first circuit, a processing circuit and a conversion circuit. The first circuit may be configured to generate a first intermediate signal in a second format in response to an input signal in a first format. The processing circuit may be configured to generate a second intermediate signal and a third intermediate signal in response to the first intermediate signal. The conversion circuit may be configured to generate an output signal in the first domain in response to the second intermediate signal and the third intermediate signal. The processing circuit may allow color blending to be implemented on the second intermediate signal in the second format prior to conversion to the first domain and pass the third intermediate signal without color blending.

The objects, features and advantages of the present invention include providing a method and/or apparatus for implementing color management that may (i) implement a number of parameters to define the input/output denominators for each color domain specification, (ii) perform editing in a user friendly space as a perceptional color model, (iii) support a number of pairs of color domains for color mapping a variety of colors, (iv) provide programmable guard band for smooth color transitions, and/or (v) provide spatial color blending for a smoother color change.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
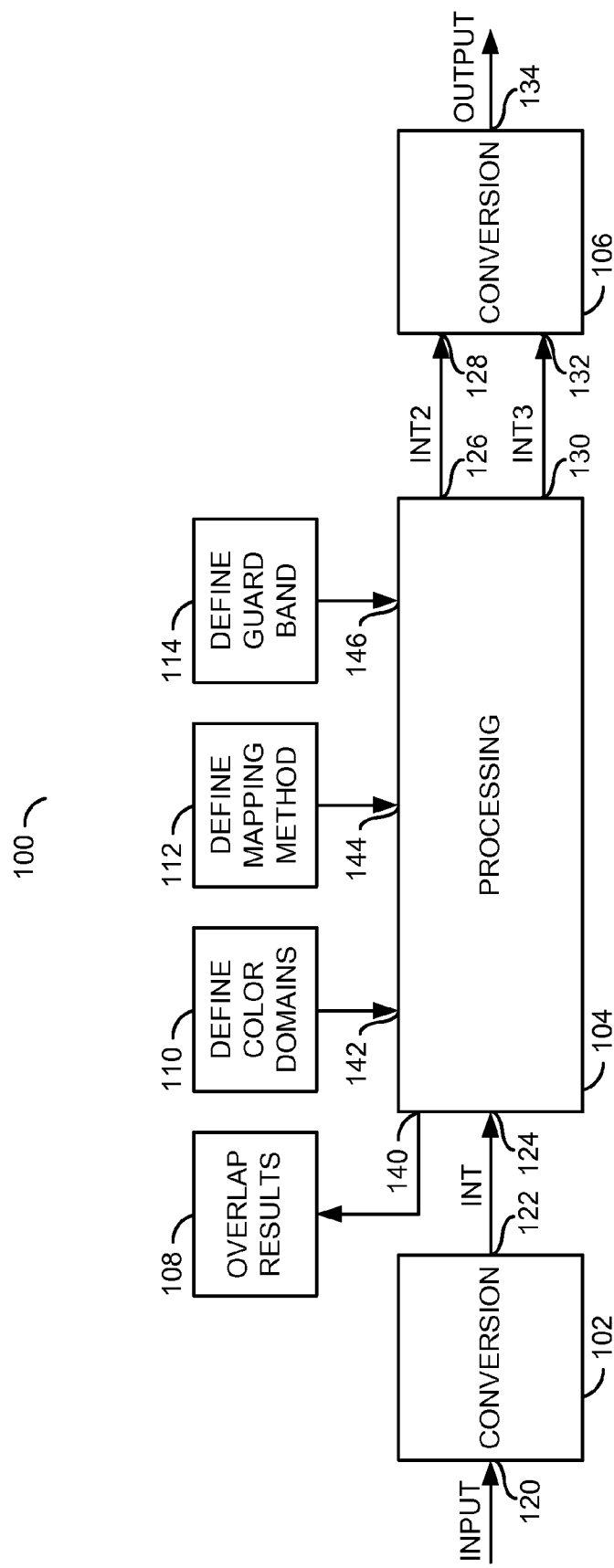
FIG. 1 is a block diagram of an embodiment of the present invention.

Referring to FIG. 1, a block diagram of a circuit 100 is shown in accordance with an embodiment of the present invention. The circuit 100 generally comprises a block (or circuit) 102, a block (or circuit) 104, a block (or circuit) 106. The circuit 102 may be implemented as a conversion circuit. The circuit 104 may be implemented as a processing circuit. The circuit 106 may be implemented as a conversion circuit. In one example, the circuit 102 may be a CSC (Color Space Conversion Core) circuit used to convert to HSV (hue, saturation, value). However, other types of conversion circuits may be implemented. In one example, the circuit 106 may be a CSC circuit used to convert from HSV. However, other types of conversion circuits may be implemented.

The circuit 104 may be implemented as a processing circuit. The circuit 102 may receive a signal (e.g., INPUT) from an input 120. The signal INPUT may be a video signal. In one example, the signal INPUT may be in an RGB (Red, Blue, Green) format, a YCbCr (or Y'CbCr) format (e.g., component), or other format. In general, the signal INPUT may be in a 3 color channel format that may be displayed by a monitor or display device. The circuit 102 may have an output 122 that may present a signal (e.g., INT) to an input 124. The signal INT may be in the HSV format. The processing circuit 104 may have an output 126 that may present a signal (e.g., INT2) to an input 128 of the circuit 106. The signal INT2 may represent a portion of the signal INT with one or more colors that have been processed. The processing circuit 104 may also have an output 130 that may present a signal (e.g., INT3) to an input 132 of the circuit 106. The signal INT3 may represent a portion of the signal INT2 with one or more pixels that have not been processed. The circuit 106 may have an output 134 that may present a signal (e.g., OUTPUT). In general, the signal OUTPUT may be in a 3 color channel format that may be displayed by a monitor or display device. The processing circuit 104 may also have an output 140 that may present a signal to the circuit 108. The circuit 104 may also have an input 142 that may receive a signal from the circuit 110, an input 144 that may receive the signal from the circuit 112 and an input 146 that may receive a signal from the circuit 114.

The processing circuit 104 normally operates in the HSV (or similar) space. The HSV space may define colors as a 3 number value for each pixel in a specified format (e.g., hue, saturation, value). The HSV model may be referred to as a hex-cone color model. "Value" may sometimes be modified to become a brightness. Such a model may be referred to as an HSB model, which may also be used in the circuit 100. "Value" may sometimes be modified to become lightness. Such a model may be referred to as an HSL model, which may also be used in the circuit 100. The circuit 100 may operate with any particular format of hex-cone color models.

The HSV space may be useful for performing editing using a perceptional color model. A user may easily specify color range by changing the value of one or more of the Hue/Saturation/Value parameters. For example, an operation such as making red appear more reddish (e.g., when making an adjustment for skin tones) while keeping other colors unchanged may be easily accomplished by changing the hue and/or saturation for certain colors. While such adjustments may be easy and intuitive in the HSV domain, the same adjustment may not be intuitive in the YCbCr or RGB domain.

Conversion of color space from different standards (e.g., BT.601, BT.709, etc.) may also be implemented. A 6 parameter model may be used to define the input/output denominators for each color domain specification. The 6 parameters may be a minimum/maximum value for each channel (e.g., hue/saturation/value). For example, the 6 parameters may be defined as a minimum hue, a maximum hue, a minimum saturation, a maximum saturation, a minimum value, a maximum value. These 6 parameters define a circular section in the HSV space, which generally describes a color domain.

In an HSV model, the hue may be represented as an angle that may vary from 0 degrees to 360 degrees. The following TABLE 1 may define hue:

TABLE 1

| Angle | Color |
|---|---|
| 0-60 | Red |
| 60-120 | Yellow |
| 120-180 | Green |
| 180-240 | Cyan |
| 240-300 | Blue |
| 300-360 | Magenta |

The conversion performed by the circuit 102 and/or the circuit 106 may be implemented using known techniques, such as using a Color Space Conversion Core. In one example, each pixel may be converted from RGB to HSV according to the following:

r, g, b∈[0,1] generally define the red, green and blue coordinates, respectively, of a color in RGB space; max may define the greatest of r, g, b; min may define the least of r, g, b.

The h, or hue of an HSV color may be determined by:

$$h = \begin{cases} 0, & \text{if max = min} \\ \left(60° \times \frac{g-b}{\max-\min} + 360°\right) \mod 360° & \text{if max} = r \\ 60° \times \frac{b-r}{\max-\min} + 120° & \text{if max} = g \\ 60° \times \frac{r-g}{\max-\min} + 240° & \text{if max} = b \end{cases}$$

Saturation may indicate a range of grey. Saturation may be expressed as a percentage that may vary from 0 to 100%, or as a value from 0 to 1. When the saturation is "0", the color is grey. When the saturation is "1", the color is the primary color.

Value may indicate the brightness of a color. Value may range from 0 to 100%. A "0" may be totally black. As value increases, the color space may brighten to show various colors.

The values for s and v (saturation and value) of an HSV color may be defined as follows:

$$s = \begin{cases} 0, & \text{if max = 0} \\ \frac{\max-\min}{\max} = 1 - \left(\frac{\min}{\max}\right), & \text{otherwise} \end{cases}$$

$$v = \max$$

A similar conversion of each pixel from HSV to RGB may be obtained by calculating an (r,g,b) triplet by defining:

$$h_i = \left[\frac{h}{60}\right] \mod 6$$

$$f = \frac{h}{60} - \left[\frac{h}{60}\right]$$

$$p = v \times (1-s)$$

$$q = v \times (1 - f \times s)$$

$$t = v \times (1 - (1-f) \times s)$$

The RGB triplet (r,g,b) may be calculated as:

$$(r, g, b) = \begin{cases} (v, t, p) & \text{if } h_i = 0 \\ (q, v, p) & \text{if } h_i = 1 \\ (p, v, t) & \text{if } h_i = 2 \\ (p, q, v) & \text{if } h_i = 3 \\ (t, p, v) & \text{if } h_i = 4 \\ (v, p, q) & \text{if } h_i = 5 \end{cases}$$

Similar conversions may be implemented to convert RGB to/from HSL, HSI, HSB, etc. Similar conversions may be implemented to convert to/from YCbCr and/or other formats.

Figure 2:
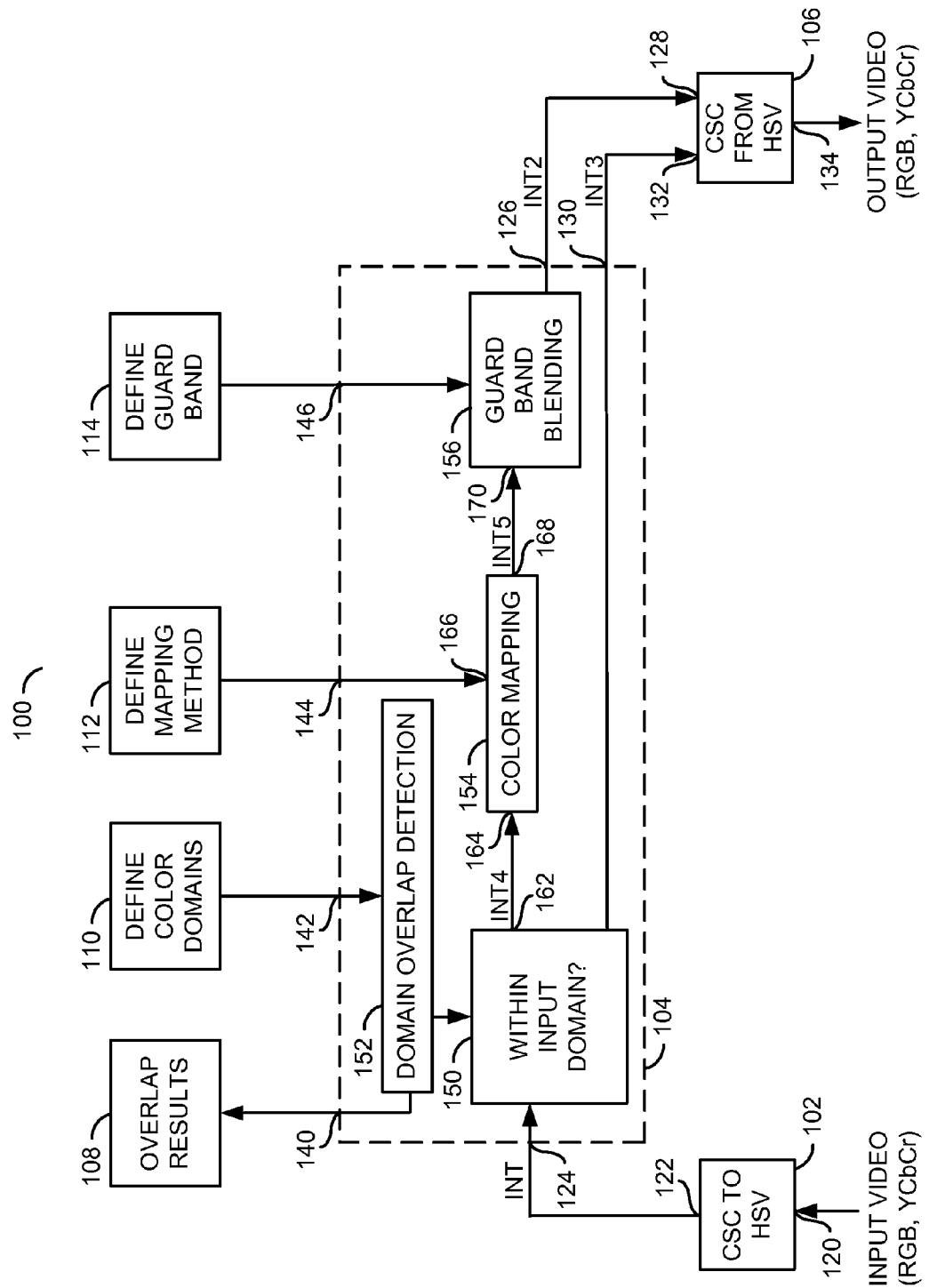
FIG. 2 is a more detailed diagram of an embodiment of the present invention.

Referring to FIG. 2, a more detailed diagram of the circuit 100 is shown. The circuit 104 may include a block (or circuit) 150, a block (or circuit) 152, a block (or circuit) 154 and a block (or circuit) 156. The circuit 150 may receive the signal INT from the circuit 102. The circuit 150 may have an output 162 and may present a signal (e.g., INT4) to an input 164 of the circuit 154. The circuit 154 may have an input 166 that may receive a signal from the circuit 112. The circuit 154 may also have an output 168 that may present a signal (e.g., INT5) to an input 170 of the circuit 156.

Figure 3:
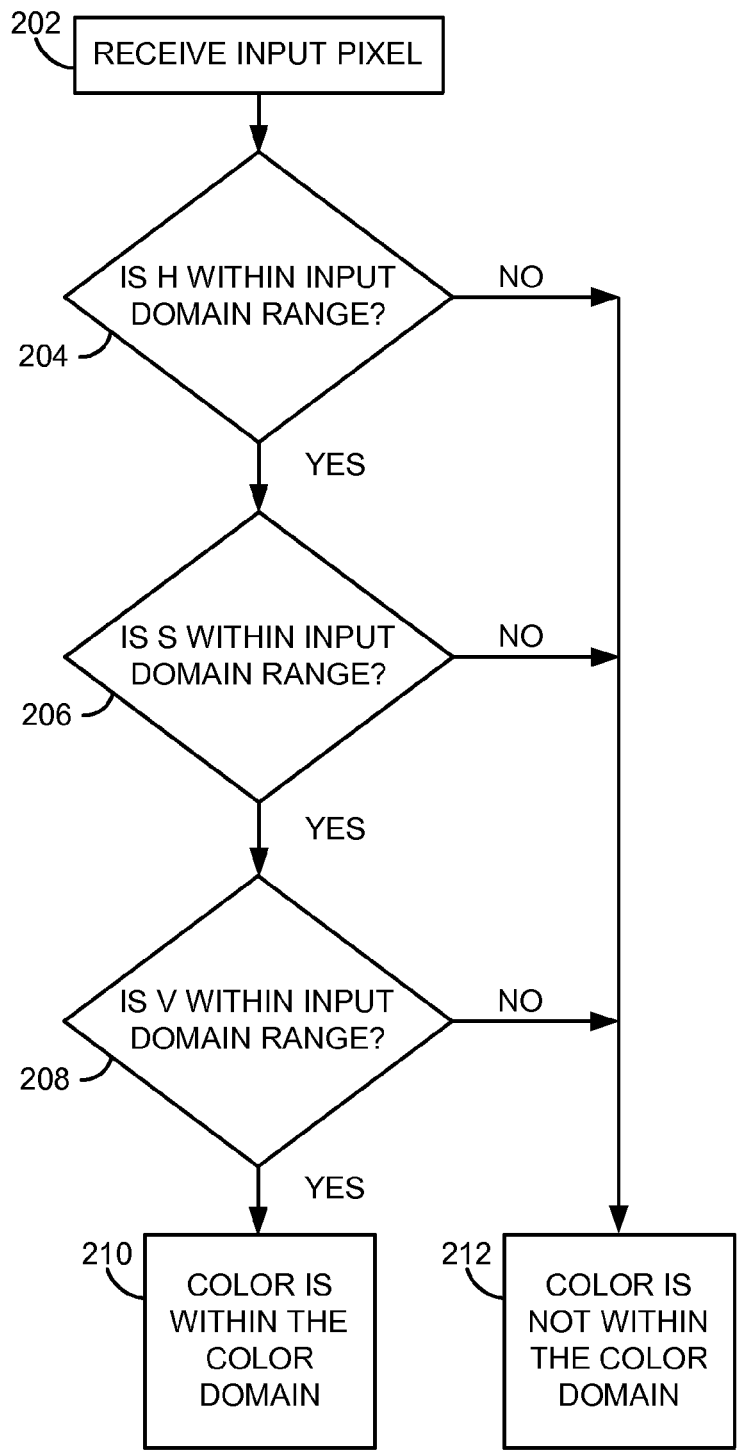
FIG. 3 is a flow diagram of an example implementation of guard band blending is shown.

With the circuit 100, a user may transform one or more colors of the signal INPUT through color mapping by specifying input and output color domains. Such user specified input may be received from the circuit 110. The circuit 110 may be part of a user interface (to be described in more detail in connection with FIG. 4). To implement color mapping, one or more colors may be transformed to the HSV domain or space (e.g., a hue, saturation, value color model). A particular transformed HSV color may then be examined by the circuit 150 to determine whether the particular transformed color is within one of 8 input color domains defined by 6 parameters, as shown in FIG. 3. In the event of an overlap among the domains, the various domains may be prioritized (e.g., domain 0 has the highest priority and domain 7 has the lowest priority). The particular transformed color is then mapped by the circuit 154 to the corresponding output color domain if the color is within the input color domains. Guard band blending or spatial blending mapping methods may be used for the color mapping. Such input may be received from the circuit 112, which may be incorporated in a user interface.

The circuit 100 may support a number of pairs of color domains for color mapping. A pair generally represents each input color domain, defined by 6 parameters, and may have one corresponding output color domain which is also defined by 6 parameters. In one example, 8 input/output pairs may be used due to the requirement from applications and memory consideration. However, additional pairs may be implemented to meet the design criteria of a particular implementation.

The circuit 156 may be used as a programmable guard band to smooth color transition. Spatial color blending may also be implemented for smoother color change. Because color mapping is implemented in the color space domain, there is generally no consideration for spatial neighborhood. A possible case where spatial blending may be useful may occur where the color of one pixel is changed and a neighboring pixel is not changed. The color difference between these two pixels is enlarged. Without the circuit 156, the color transition between these two neighboring pixels may cause unpleasant artifact viewing, especially for smooth color areas like skin tone or some colorful natural scenes.

The circuit 156 may implement guard band blending (or spatial blending) on colors close to the boundary of the input color domains but not within the input domain. For guard band blending, the color will be slightly altered toward the closest input domain for smoother color transition. For spatial blending (e.g., a 3×2 spatial filter blending), the color will be slightly altered toward the color of a neighboring pixel if the difference between the color and the color of the neighboring pixel are within a predefined threshold. The color remains unchanged if neither guard band blending nor spatial blending are implemented. The mapped colors may again be converted back to output color space (e.g., RGB, YCbCr, Y'CbCr, etc.) from HSV by the circuit 106.

With the circuit 100, editing may be implemented in the HSV color space, while the output color remains RGB or Y'CbCr. The signal INT3 generally represents a portion of the color that is not within the input domain and will normally remain unchanged (e.g., not go through the color mapping process). By selectively choosing which colors to process, a user may map those colors specified, while leaving other colors unchanged.

A color is generally defined to be within the guard band if the H, S, V values of the color are in the range of (Low_H−bottomH, High_H+topH), (Low_S−bottomS, High_S+topS) and (Low_V−bottomV, High_V+topV) when Low_H, High_H, Low_S, High_S, Low_V, and High_V are parameters defining the input domain D and bottomH, topH, bottomS, topS, bottomV, topV are parameters defining the guard band. The circuit 114, which may be incorporated into a user interface, may be used to define the guard band parameters.

If a color is within the guard band and also within the input domain, then the color is transformed according to the guard band transform. If the color is within the guard band but not within the input domain, then the color is transformed according to another guard band transform. A linear or non-linear transform may be defined for the color.

The circuit 152 may be used as a domain overlap detection where the domain defines a circular section in HSV space. Two domains are overlapped if an overlap occurs between two defined circular sections. For example, consider a first domain defined by Low_H1, High_H1, Low_S1, High_S1, Low_V1 and High_V1 and a second domain defined by Low_H2, High_H2, Low_S2, High_S2, Low_V2 and High_V2. Then, consider a first condition defined by:

(Low_$H2$<=Low_$H1$<=High_$H2$ OR Low_$H2$<=High_$H1$<=High_$H2$) AND (Low_$S2$<=Low_$S1$<=High_$S2$ OR Low_$S2$<=High_$S1$<=High_$S2$) AND (Low_$V2$<=Low_$V1$<=High_$V2$ OR Low_$V2$<=High_$V1$<=High_$V2$)

and a second condition defined by:

(Low_$H1$<=Low_$H2$<=High_$H1$ OR Low_$H1$<=High_$H2$<=High_$H1$) AND (Low_$S1$<=Low_$S2$<=High_$S1$ OR Low_$S1$<=High_$S2$<=High_$S1$) AND (Low_$V1$<=Low_$V2$<=High_$V1$ OR Low_$V1$<=High_$V2$<=High_$V1$).

In general, if either the first condition or the second condition is true, then the two domains are overlapped. The circuit 108 may be incorporated in a user interface to display the overlap results to a user.

Referring to FIG. 3, a method (or process) 200 is shown implementing an example of the input domain logic for the circuit 150. The method 200 generally comprises a step (or state) 202, a decision step (or state) 204, a decision step (or state) 206, a decision step (or state) 208, a step (or state) 210, and a step (or state) 212. The state 202 generally receives an input pixel. The decision state 204 determines whether H is within an input domain range. If not, the method 200 moves to the state 212 which normally indicates that the color of the pixel is not within the color domain. If the H of the pixel is within the domain range, the method 200 moves to the decision state 206. The decision state 206 determines whether S is within an input domain range. If not, the method 200 moves to the state 212. If so, the method 200 moves to the decision state 208. The decision state 208 determines whether the V is within an input range. If not, the method 200 moves to the state 212. If so, the method 200 moves to the state 210. The state 210 normally indicates that the color of the pixel is within a particular color domain designed for processing.

Spatial blending may be implemented for spatial windows that include both changed pixels and unchanged pixels after color mapping. A spatial filter (e.g., a bi-lateral filter for color mapping purpose) may be used to change the colors of those pixels such that spatially the color transition between spatial neighbors becomes smoother.

While the representation of various pixels has been described, the circuit 100 generally processes a number of pixels in each frame of a video signal. For example, the signal input may be in a variety of formats (e.g., 480i, 480p, 720p, 1080i, 1080p, etc.). A 720p signal may include 720 pixels in one direction and 1280 pixels in another direction (e.g., 720× 1280). Other video formats may be represented in a similar horizontal×vertical format.

The circuit 100 may be used for applications that need manipulation of certain colors, but leave other colors unchanged. For example, the circuit 100 may be used to enhance the quality of a display picture. A green and blue stretch may be used to make grass and sky colors more vivid. Also, the circuit 100 may be used for flesh tone correction by using techniques such as flesh tone detection. The circuit 100 may also be used to compensate and calibrate inaccurate colors caused by hardware input and/or output without necessarily changing all the colors.

Figure 4:
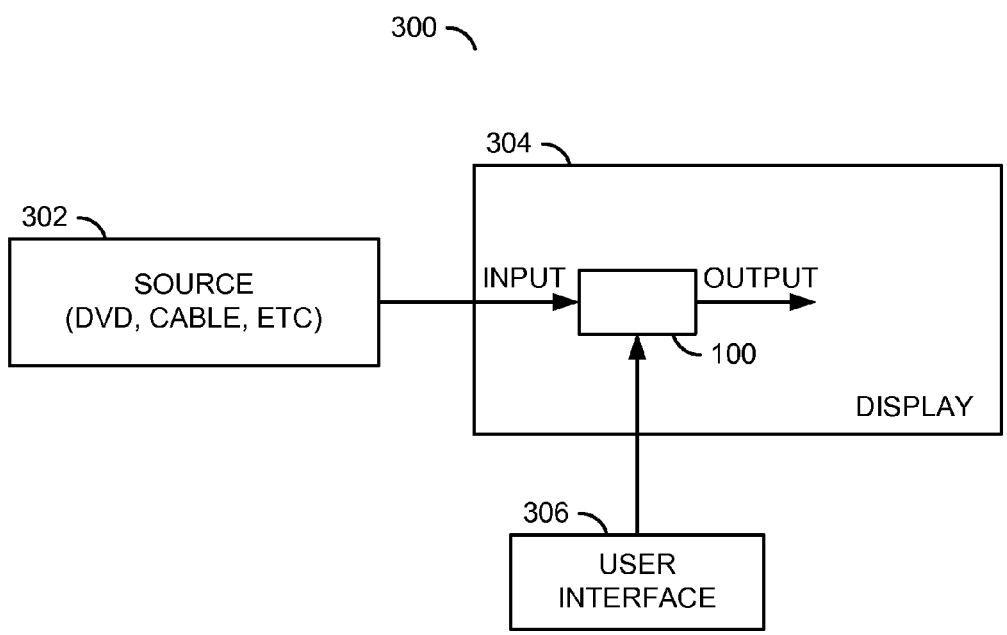
FIG. 4 is a diagram of an implementation of the present invention.

Referring to FIG. 4, a system 300 is shown implementing the circuit 100. The system 300 generally comprises a source device 302, a display 304 and a user interface 306. The source device 302 may be a DVD player, a Blu-Ray player, a video game console, a computer, a video source cable, or other similar source. The display 304 may be a television set, a computer monitor, or another similar display device. In one example, the user interface 306 may be implemented as part of the controls of the display 304. Alternately, the user interface 306 may be part of a remote control system or a separate electronic device. The user interface 306 generally incorporates the circuits 108, 110, 112 and 114. In either implementation, an on screen display, or other type of user feedback, may be used to control which particular color is chosen for adjustment. Additionally, a number of preset colors may be provided to make it easier for a user to adjust a particular color. For example, a color related to a skin tone adjustment may be put in a certain portion of the menu. In another example, a color related to sporting events (e.g., the color of the grass of a football field or golf course) may be set apart in another portion of the menu. Completely customized colors may also be implemented.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a first circuit configured to generate a first intermediate signal in a second format in response to an input signal in a first format;
   a processing circuit configured to generate a second intermediate signal and a third intermediate signal in response to said first intermediate signal and further in response to a color domain input signal, a guard band input signal and a mapping method input signal, wherein said processing circuit further generates an overlap results signal;
   a conversion circuit configured to generate an output signal in said first format in response to said second intermediate signal and said third intermediate signal, wherein said processing circuit is configured to (i) implement spatial color blending on said second intermediate signal in said second format prior to conversion to said first format and (ii) pass said third intermediate signal without said spatial color blending.

2. The apparatus according to claim 1, wherein said first format comprises an RGB format.

3. The apparatus according to claim 1, wherein said first intermediate signal comprises a video signal in an RGB format.

4. The apparatus according to claim 1, wherein said second intermediate signal comprises a signal in an HSV format.

5. The apparatus according to claim 1, wherein said conversion circuit generates said output signal in an RGB format in response to said second and third intermediate signals.

6. An apparatus comprising:
   means for generating a first intermediate signal in a second format in response to an input signal in a first format;
   means for processing a second intermediate signal and a third intermediate signal in response to said first intermediate signal and further in response to a color domain input signal, a guard band input signal and a mapping method input signal, and wherein said means for processing further generates an overlap results signal; and
   means for generating an output signal in said first format in response to said second intermediate signal and said third intermediate signal, wherein said means for processing is configured to (i) implement spatial color blending on said second intermediate signal in said second format prior to conversion to said first format and (ii) pass said third intermediate signal without said spatial color blending.

7. A method for implementing video processing, comprising the steps of:
   (A) generating a first intermediate signal in a second format in response to an input signal in a first format;
   (B) generating an overlap results signal, a second intermediate signal and a third intermediate signal in response to said first intermediate signal and further in response to a color domain input signal, a guard band input signal and a mapping method input signal;
   (C) implementing spatial color blending on said second intermediate signal in said second format;
   (D) passing said third intermediate signal without said spatial color blending; and
   (E) generating an output signal in said first format in response to said second intermediate signal and said third intermediate signal.

8. The method according to claim 7, wherein said first format comprises an RGB format.

9. The method according to claim 7, wherein said first intermediate signal comprises a video signal in an RGB format.

10. The method according to claim 7, wherein said second intermediate signal comprises a signal in an HSV format.

11. The method according to claim 7, wherein step (E) generates said output signal in an RGB format in response to said second and third intermediate signals.

* * * * *